R. KLINE.
DISH DRAINER.
APPLICATION FILED NOV. 29, 1918.

1,349,771. Patented Aug. 17, 1920.

Robert Kline
Inventor
By
Hull, Smith, Brock, & West
His Attorneys

UNITED STATES PATENT OFFICE.

ROBERT KLINE, OF CLEVELAND, OHIO.

DISH-DRAINER.

1,349,771.  Specification of Letters Patent.  Patented Aug. 17, 1920.

Application filed November 29, 1918. Serial No. 264,665.

*To all whom it may concern:*

Be it known that I, ROBERT KLINE, a citizen of the United States, residing at Cleveland, in the county of Cuyahoga and State of Ohio, have invented a certain new and useful Improvement in Dish-Drainers, of which the following is a full, clear, and exact description, reference being had to the accompanying drawings.

This invention relates to dish drainers, or trays arranged to be employed in connection with a sink in order to receive dishes after the same are rinsed and allow the water to drain away, or to receive the dishes prior to rinsing and accomplish the steps both of rinsing and draining. The objects of the invention are the provision of a simple and rigid device of this character which shall hold the dishes in position to drain easily and prevent the same from sliding off or breaking; the provision of a device arranged to minimize splashing and to deliver all surplus drainage water into the sink without wetting the surrounding objects; the provision of an attractive, durable, convenient, and inexpensive kitchen utensil; while further advantages of my said invention will become apparent as the description proceeds.

Figure 1:
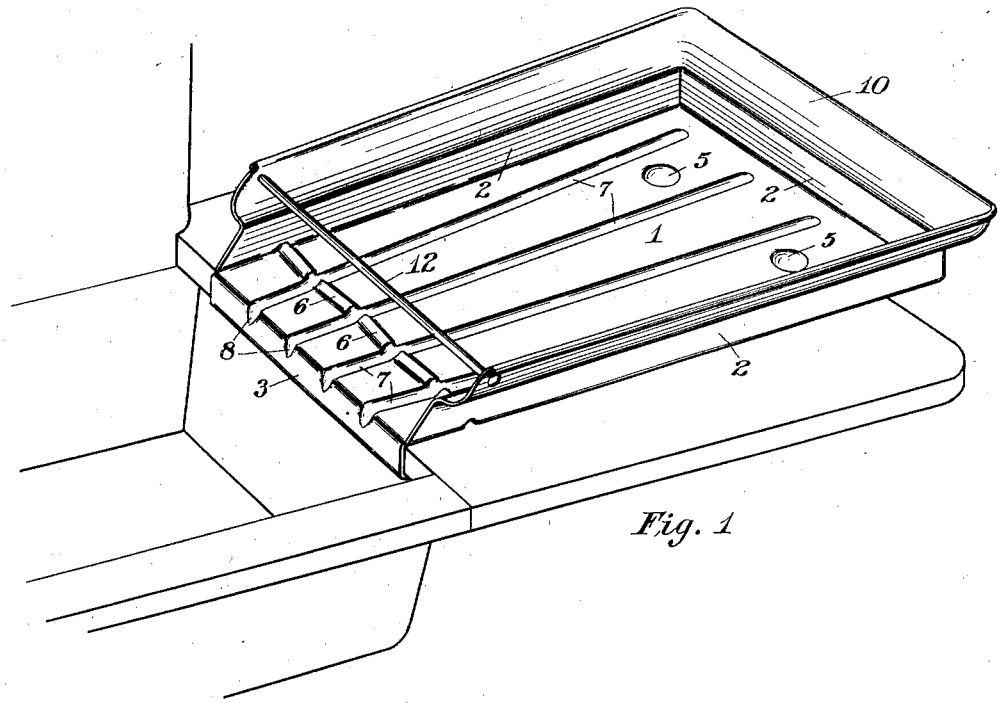
Figure 2:
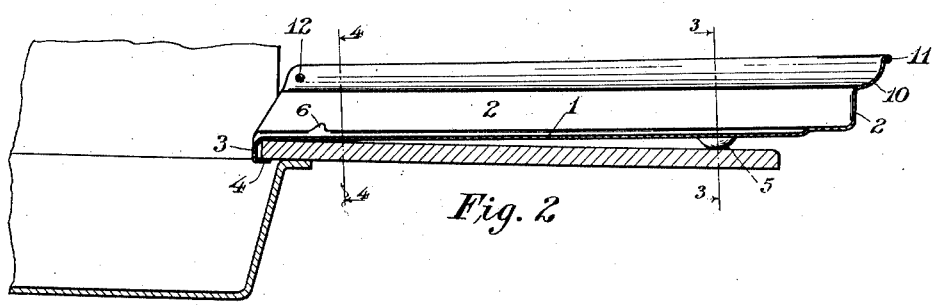
Figures 3, 5:
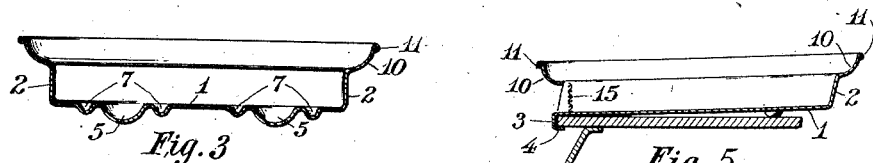
Figure 4:
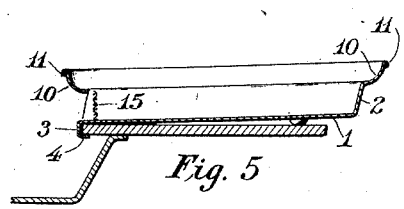

In the drawing accompanying and forming a part of this application I have illustrated certain embodiments of my said invention although it will be understood that the same are illustrative merely and are not intended to limit me to the constructions or combinations therein shown. In these drawings Figure 1 is a perspective view of the complete device in operative position upon a sink; Fig. 2 is a longitudinal sectional view of the same; Figs. 3 and 4 are sectional views corresponding to the lines 3—3 and 4—4 respectively of Fig. 2; and Fig. 5 is a sectional view showing a modified form of the device.

Describing the parts by reference characters my improved dish drainer comprises a substantially rectangular tray having a bottom 1 and also having substantially upright walls 2—2 rising abruptly from that bottom. At the fourth side, the bottom instead of being turned upwardly to form a wall is bent downwardly as at 3 to form a discharge apron and has its lip preferably turned under yet farther as shown at 4 so as to become hooked under the sinkboard. This construction both shields the sink board against wetting or splashing and also enables the device to be hooked in place as shown in Fig. 5 in case the sink board be too short to receive it fully.

At a point removed from the apron 3 the bottom 1 is preferably formed with legs for elevating the same into an inclined or liquid discharging position, such legs being here shown as consisting of embossed protuberances 5—5. Adjacent to its open side the bottom 1 is also preferably provided with means for preventing dishes from sliding into the sink and becoming broken, such as the transverse elevated rib 6, the same preferably having a rather abrupt ledge upon the side turned toward the body of the tray. The bottom 1 is also preferably formed with longitudinal corrugations 7—7 which serve the double purpose of stiffening the same to prevent warping and of providing channels for the discharge of the liquid. The ends of these corrugations are also preferably continued for a distance along the apron 3 as shown at 8 herein, so as to stiffen this apron and minimize its tendency to break off at the upper edge. These corrugations intersect the rib 6 in a plurality of places, and the rib sections are preferably but not necessarily arranged at a slight angle relatively to each other as shown.

At about midway of their height the walls 2—2 are preferably turned abruptly outward to form substantially horizontal ledges as shown at 10, and are thereafter extended in an upwardly and outwardly directed curve 11, thus forming a shoulder for the support of dishes, while providing a rim around that shoulder to prevent the splashing of liquid outside of the tray. In Fig. 1 I have shown the open or third side of the device as traversed by a tie-rod 12 which serves the double purpose of securing together and stiffening the side walls and of forming an additional support for dishes.

In Fig. 5, instead of the tie-rod 12, I have shown the portions 10 and 11 of the tray walls as continued across the discharge portion, the wall 2 however being omitted at this point and supplanted by a coarse metal screen 15, which also takes the place of the rib 6. It will be obvious that many other changes in detail can also be made within the scope of my invention.

Having thus described my invention, what I claim is:—

A dish drainer comprising a straight edged tray, one of the edges being turned downwardly to constitute a discharge side and the remaining edges being turned upwardly to form dish-receiving walls, the margin of said first side being bent around substantially parallel with the bottom of the tray so as to form a hook adapted to embrace the end of the sinkboard.

In testimony whereof, I hereunto affix my signature.

ROBERT KLINE